US007966273B2

(12) United States Patent
Hegeman et al.

(10) Patent No.: US 7,966,273 B2
(45) Date of Patent: Jun. 21, 2011

(54) PREDICTING FORMATION FLUID PROPERTY THROUGH DOWNHOLE FLUID ANALYSIS USING ARTIFICIAL NEURAL NETWORK

(75) Inventors: Peter Hegeman, Stafford, TX (US); Chengli Dong, Sugar Land, TX (US); Charles Woodburn, Marnes la Coquette (FR); Graham Birkett, Paris (FR); Nikos Varotsis, Crete (GR); Vassilis Gaganis, Crete (GR)

(73) Assignee: Schlumberger Technology Corporation, Sugar Land, TX (US)

( * ) Notice: Subject to any disclaimer, the term of this patent is extended or adjusted under 35 U.S.C. 154(b) by 724 days.

(21) Appl. No.: 12/098,526

(22) Filed: Apr. 7, 2008

(65) Prior Publication Data

US 2009/0030858 A1    Jan. 29, 2009

Related U.S. Application Data

(60) Provisional application No. 60/952,295, filed on Jul. 27, 2007.

(51) Int. Cl.
*G06N 3/08* (2006.01)
*E21B 49/08* (2006.01)
*G01V 3/00* (2006.01)

(52) U.S. Cl. .......................................... 706/17; 166/264
(58) Field of Classification Search ..................... 706/17
See application file for complete search history.

(56) References Cited

U.S. PATENT DOCUMENTS

| 6,799,117 | B1 | 9/2004 | Proett et al. |
| 7,219,541 | B2* | 5/2007 | DiFoggio .................. 73/152.17 |
| 7,305,306 | B2* | 12/2007 | Venkataramanan et al. ...... 702/9 |
| 7,395,704 | B2* | 7/2008 | DiFoggio .................. 73/152.42 |
| 2005/0205256 | A1* | 9/2005 | DiFoggio ................. 166/250.16 |
| 2005/0242807 | A1* | 11/2005 | Freedman ..................... 324/303 |
| 2007/0011114 | A1 | 1/2007 | Chen et al. |
| 2007/0159625 | A1* | 7/2007 | DiFoggio ..................... 356/328 |

FOREIGN PATENT DOCUMENTS

WO    WO2007001731    1/2007

OTHER PUBLICATIONS

C. Dong, SPE, and M. O'Keefe, SPE, Schlumberger; H. Elshahawi, SPE, and M. Hashem, SPE, Shell; S. Williams, SPE, Hydro; Stensland, Eni Norge; P. Hegeman, SPE, R. Vasques, T. Terabayashi, O. Mullins, SPE, and E. Donzier, Schlumberger, "New Downhole Fluid Analyzer Tool for Improved Reservoir Characterization" Source Offshore Europe, Sep. 4-7, 2007.*

* cited by examiner

*Primary Examiner* — Jeffrey A Gaffin
*Assistant Examiner* — Ola Olude-Afolabi
(74) *Attorney, Agent, or Firm* — David J. Smith; Dave R. Hofman

(57) ABSTRACT

Apparatus and methods to perform downhole fluid analysis using an artificial neural network are disclosed. A disclosed example method involves obtaining a first formation fluid property value of a formation fluid sample from a downhole fluid analysis process. The first formation fluid property value is provided to an artificial neural network, and a second formation fluid property value of the formation fluid sample is generated by means of the artificial neural network.

26 Claims, 12 Drawing Sheets $$\mathbf{W}_0 = \begin{bmatrix} -3.46 & -12.92 & -8.24 & -6.15 & -3.51 \\ 3.86 & -13.57 & -27.25 & -20.96 & 6.18 \\ -22.54 & -94.89 & -40.27 & 8.42 & 45.02 \\ -22.28 & -49.91 & -8.83 & 4.06 & -4.94 \\ -16.95 & -63.08 & -24.59 & -11.13 & 19.75 \\ -7.05 & -6.13 & -0.11 & 9.22 & 17.95 \\ -1.63 & 6.29 & 16.75 & 21.47 & -45.88 \\ -2.98 & -12.43 & -1.56 & 0.17 & 2.83 \\ -0.16 & -0.33 & -0.08 & -0.12 & -0.51 \\ 4.31 & 0.02 & 3.04 & 2.00 & -19.99 \\ 0.98 & 2.57 & 0.15 & 1.78 & -10.53 \\ -7.16 & -35.75 & -19.03 & -21.61 & 13.51 \end{bmatrix}$$

FIG. 7A $$\mathbf{b}_0 = \begin{bmatrix} -15.82 \\ -15.91 \\ -49.34 \\ -58.78 \\ -48.44 \\ 11.65 \\ -30.58 \\ -7.06 \\ -0.69 \\ -13.68 \\ -6.79 \\ -30.86 \end{bmatrix}$$

FIG. 7B $$W_1 = [12.31 \quad 58.30 \quad -62.04 \quad -12.38 \quad -4.24 \quad -36.39$$
$$0.20 \quad -41.49 \quad 56.03 \quad 17.35 \quad 44.76 \quad 30.48]$$

| SAMPLE # | INPUT DATA | GOR (scf/bbl) | UNCERTAINTY (%) |
|---|---|---|---|
| 234 | <DATA..> | 9,458 | 5 |
| 235 | <DATA..> | 9,565 | 5 |
| 236 | <DATA..> | 9,577 | 6 |
| 238 | <DATA..> | 9,654 | 6 |
| 239 | <DATA..> | 9,655 | 5 |

WELL LOG DATA STRUCTURE

|  | TRAINING SET | VALIDATION SET | COMPLETE SET |
|---|---|---|---|
| NUMBER OF POINTS | 1650 | 184 | 1834 |
| MEAN RELATIVE ERROR (%) | 1.5 | 3.0 | 1.6 |
| MEAN ABSOLUTE RELATIVE ERROR (%) | 10.5 | 11.5 | 10.6 |
| STANDARD DEVIATION (%) | 17.2 | 20.7 | 17.6 |

902

|  | GOR <= 3000 scf/stb SET | GOR > 3000 scf/stb SET | COMPLETE SET |
|---|---|---|---|
| NUMBER OF POINTS | 1341 | 493 | 1834 |
| MEAN RELATIVE ERROR (%) | 1.7 | 1.3 | 1.6 |
| MEAN ABSOLUTE RELATIVE ERROR (%) | 9.6 | 13.3 | 10.6 |
| STANDARD DEVIATION (%) | 17.1 | 19.0 | 17.6 |

PREDICTING FORMATION FLUID PROPERTY THROUGH DOWNHOLE FLUID ANALYSIS USING ARTIFICIAL NEURAL NETWORK

RELATED APPLICATIONS

This application claims the benefit of U.S. provisional application 60/952,295, filed on Jul. 27, 2007, which is hereby incorporated by reference herein in its entirety. This application is also related to U.S. application Ser. No. 11/738,156, filed on Apr. 20, 2007, which is hereby incorporated by reference herein in its entirety.

FIELD OF THE DISCLOSURE

The present disclosure relates generally to measuring formation fluids and, more particularly, to methods and apparatus to perform downhole fluid analysis using an artificial neural network.

BACKGROUND

Reservoir characterization and asset management use comprehensive information about formation fluids. This information is typically obtained at all stages of the exploration and development cycle for economic evaluation, field planning, and reservoir operation. In most hydrocarbon reservoirs, fluid composition varies vertically and laterally in a formation. Fluids may exhibit gradual changes in composition caused by gravity or biodegradation, or they may exhibit more abrupt changes due to structural or stratigraphic compartmentalization. Traditionally, fluid information has been obtained by capturing samples, either at downhole or surface conditions, and then measuring the pressure/volume/temperature (PVT) properties in a surface laboratory. In recent years, downhole fluid analysis (DFA) techniques, including contamination monitoring, composition measurement and single-phase assurance, have provided fluid property information during a formation test, well test, or any other in situ well bore operation. The extreme conditions of the well bore (downhole) environment limit the sophistication of DFA measurement tools, and therefore limit the measurement of fluid properties to a small subset of those provided by a conventional (surface) laboratory analysis of a fluid sample.

SUMMARY

In accordance with a disclosed example, an example method to determine formation fluid properties involves obtaining a first formation fluid property value of a formation fluid sample from a DFA process. The first formation fluid property value is provided to an artificial neural network (ANN). A second formation fluid property value of the formation fluid sample is generated by means of the ANN, and an uncertainty value indicative of an accuracy of the second formation fluid properly value is determined.

In accordance with another disclosed example, an example apparatus to determine formation fluid properties includes a data interface to obtain a first formation fluid property value including a plurality of components of a formation fluid sample determined using a DFA process. The example apparatus also includes an ANN to generate a second formation fluid property value of the formation fluid sample based on the first formation fluid property value, wherein the second formation fluid property value is at least one of a gas/oil ratio (GOR), a formation volume factor, and a stock tank oil hydrocarbon density.

In accordance with another disclosed example, an example method to determine formation fluid properties involves determining a correlation between a property of a first fluid and values indicative of concentrations (e.g., mass fractions) in methane and ethane components of the first fluid. A downhole tool comprising a fluid analyzer is lowered into a well. The example method also involves obtaining values indicative of the concentrations of methane and ethane components of a downhole fluid sample obtained by means of the downhole tool. A fluid property value associated with the downhole fluid sample is then generated based on the correlation and the values.

In accordance with another disclosed example, an example method of sampling a fluid involves lowering a sampling tool into the borehole, the sampling tool comprising a fluid analyzer, a pumping module, and a probe module, obtaining a fluid sample from one of the formation and the borehole using a first sampling profile, analyzing the fluid sample with the fluid analyzer, determining a property of the fluid sample that is indicative of a composition of the fluid sample, and changing the first sampling profile based on the analysis of the fluid sample.

In accordance with yet another disclosed example, an example method of sampling a fluid involves lowering a sampling tool into the borehole, the sampling tool comprising a fluid analyzer, obtaining a first fluid sample from one of the formation and the borehole at a first station, analyzing the first fluid sample with the fluid analyzer, deciding, based on the analysis of the first fluid, to either store or eject the first sample, moving the tool to a second station, obtaining a second fluid sample from one of the formation and the borehole at the second station, analyzing the second fluid sample with the fluid analyzer, and deciding, based on the analysis of the second fluid to either store or eject the second sample from the tool.

BRIEF DESCRIPTION OF THE DRAWINGS

FIGS. 7A, 7B, 8A, and 8B depict weighting value and bias value data structures that may be used by the nodes of the ANN of FIG. 5 to process input data and generate output data during downhole fluid analyses.

FIG. 9 depicts a well log data structure that may be used to store uncertainty values in association with output data generated by the ANN of FIG. 5 and input data measured by the DFA tool of FIG. 2.

FIG. 10 depicts an example performance table showing the performance of the ANN of FIG. 5.

DETAILED DESCRIPTION

Figure 1:
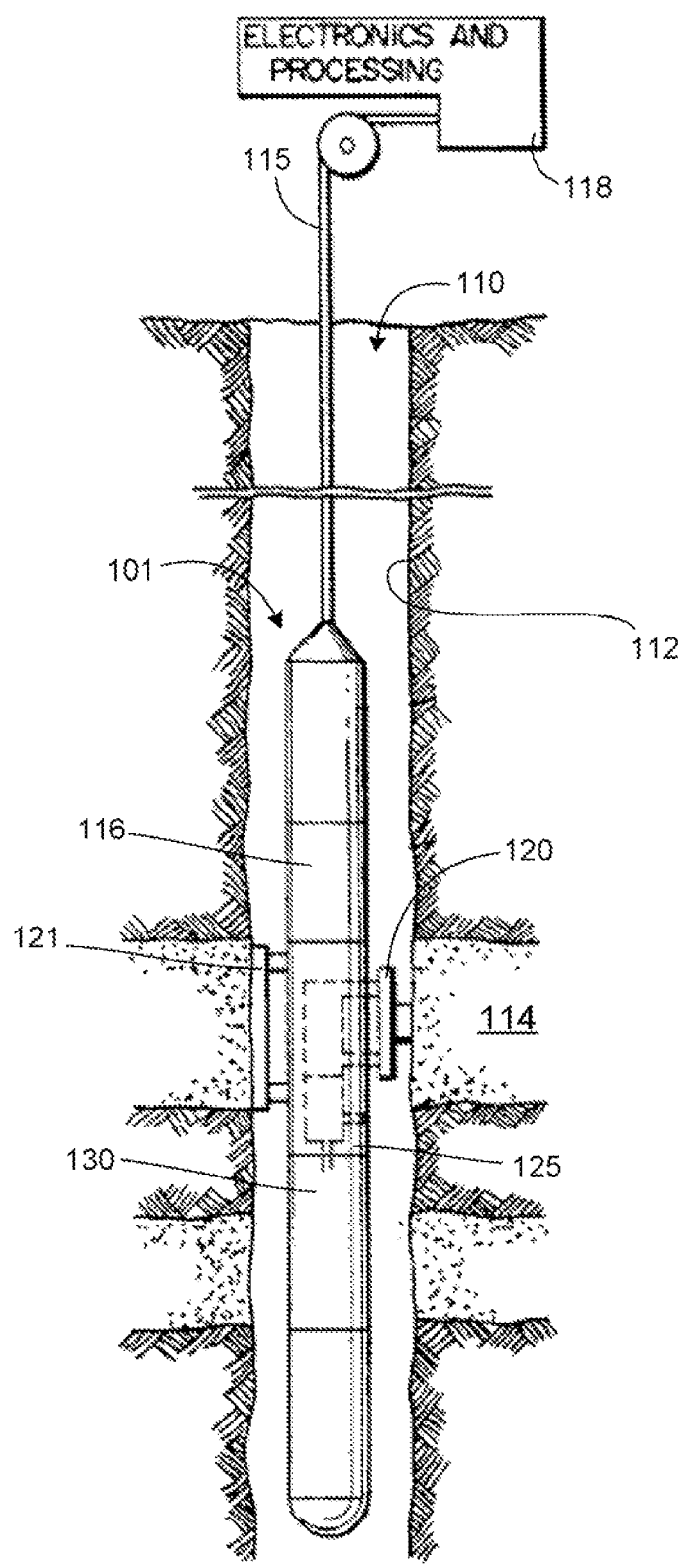
FIG. 1 depicts an example wireline tool for testing a formation and performing downhole fluid analyses of the composition and properties of formation fluids as described herein.

Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness.

The extreme conditions of a downhole environment typically limit the sophistication of downhole fluid analysis tools and, thus, limit the measurement of fluid properties to a small subset of those provided by conventional laboratory analyses of fluid samples. The example methods and apparatus described herein can be used to predict or estimate fluid properties that cannot otherwise be directly measured using a conventional DFA tool. For example, the methods and apparatus described herein may be used to predict or estimate PVT fluid properties used as input to thermodynamic models of reservoirs. Predicted values may also be advantageously used in real time to for example, optimize a fluid sample collection process. In addition, the example methods and apparatus described herein may be used to generate uncertainty estimates indicative of the accuracy of the predicted fluid properties.

The example methods and apparatus described herein can be used to predict fluid properties using fluid measurement values collected using DFA tools. In particular, the example methods and apparatus described herein predict fluid properties using an ANN, which is a nonlinear statistical data modeling tool composed of a plurality of interconnected neuron-like processing units that relate input data to output data. An ANN can be trained to learn correlations or relationships between data to model complex global behavior among that data using neuron parameters (e.g., weighting values and bias values) and the connections between the neurons. An ANN has the ability to recognize patterns in data, adjust dynamically to changes, infer general rules from specific cases, and accept a large number of input variables. The example methods and apparatus described herein can be implemented using any of a number of ANN types including a single-layer perceptron ANN and/or a multi-layer perceptron ANN. An ANN can be trained using training data in conjunction with a variety of training techniques. The ANN performance can be continuously improved by expanding the training data used to train the ANN and retraining the ANN on a periodic and/or aperiodic basis.

There are several advantages of using the example ANN described herein in DFA applications. The example ANN described herein can learn relationships between laboratory-measured input and output data in a training database by self-tuning its parameters so that the ANN can be used during downhole measurement processes to determine downhole fluid properties of extracted formation fluid samples in real time. In addition, the ANN can detect, discover, or reveal patterns in data that may be obscured to normal observation and standard statistical methods. Also, the performance of the ANN can be continuously improved by updating a training database with new laboratory-measured data and retraining the ANN. In this manner, the ANN can become increasingly expert by retraining it using a larger database.

In an example implementation, the ANN described herein can be configured to receive as inputs, fluid composition data of formation fluid measured or determined using a DFA tool. The fluid composition data preferably includes at least methane and ethane concentrations (e.g., mass fractions). The ANN is further configured to determine estimated PVT properties such as, for example, GOR properties. Although the example methods and apparatus are described below as being implemented in connection with a DFA tool that uses optical spectroscopy to determine fluid composition properties of formation fluid, the example methods and apparatus described herein can be used in connection with other types of input data to determine relationships between different types of input data and different types of output data. For example, the example methods and apparatus described herein can be configured to use an ANN that receives fluid composition data obtained using gas chromatography or mass spectroscopy. The example methods and apparatus described herein can also be configured to use an ANN that receives data from two or more sensors such as, for example, composition data obtained using an optical spectrometer and density obtained using a vibrating rod or the like. In addition, the ANN can be configured to determine other properties of fluid such as, for example, formation volume factor, oil density at stock-tank conditions, and/or other properties as a function of pressure and/or temperature such as, for example, retrograde liquid deposition curves of gas condensates. The example methods and apparatus described herein can also be configured to function as a quality-assurance tool to, for example, assess the overall consistency of the measurements from one or more DFA tools and/or to assess the quality and/or confidence of estimated PVT data output by the ANN.

In some example implementations, the example methods and apparatus described herein may be used to predict or estimate PVT properties using ethane concentration (e.g., mass fraction) values not grouped together with concentrations of molecules having a larger number of carbon atoms (e.g., the group comprising propane, butane, and pentane). Ethane concentration values may be advantageously used to increase the accuracy of the predicted PVT property values over a range of formation fluids including non-volatile oils, volatile oils, gas condensate, and wet gases.

FIG. 1 shows a cross-section of an example geological formation testing tool 101 designed to withdraw, measure characteristics of, and/or analyze fluid samples present in a geological formation 114. The example testing tool 101 of FIG. 1 may be used to, among other things, implement the example fluid characterization methods and apparatus described herein. The example tool 101 is suspended in a borehole (i.e., a well) 110 from the lower end of a conveyance 115 such as a wireline or multiconductor cable, that is spooled from the surface. However, other types of conveyances 115 may be used. At the surface, the example wireline 115 is typically connected to an example controller and/or processing system 118 that monitors and/or controls the tool 101. The example controller and/or processing system 118 of FIG. 1 and/or a controller and/or processing system 116 implemented by and/or within the tool 101 may, additionally or alternatively, perform fluid composition analyses based on one or more measurements (e.g., optical density measurements) made by and/or within the sampling tool 101 (e.g., by a fluid analyzer module 125). As will be appreciated by those skilled in the art, the example controllers 116 and 118 of FIG. 1 may include one or more microprocessors or other processors or processing units, associated memory, and other hardware and/or software. More specifically and without limitation, the tool 101 may include other modules in addition to the fluid analyzer module 125, such as a pump-out module for providing the infrastructure for pumping fluids into and out of the tool 101.

In the illustrated example, the fluid analyzer module 125 includes a spectrometer to measure the optical density of formation fluid samples. In other example implementations in which measurements (e.g., density measurements, nuclear magnetic resonating (NMR) measurements, resistivity measurements, capacitance measurements, etc.) other than or in addition to optical density measurements are used, the fluid analyzer module 125 may be replaced or supplemented with other types of suitable sensors (e.g., NMR sensors, density, sensors, resistivity sensors, capacitance sensors, etc.).

Once at a desired depth, the example tool 101 of FIG. 1 is used to obtain a formation fluid sample and/or make one or more measurements of a collected and/or passing fluid sample. The example tool 101 has any number and/or type(s) of probes (including packers), and/or fluid inlets and/or ports (one of which is designated by reference numeral 120), that are selectively extendable from the tool 101, as well as a selectively extendable anchoring member 121 on the opposite side of the tool 101. The example probe 120 of FIG. 1 extends from the tool 101 and seals against a borehole wall 112 so that the probe 120 is in fluid communication with the formation 114. The example tool 101 may also include one or more pumps (not shown) to pump formation fluids from the formation 114 into the tool 101 and/or to pump formation fluids from the tool 101 into the borehole 110.

Formation fluids sampled by the tool 101 may be contaminated with mud filtrate. That is, the formation fluids may be contaminated with the filtrate of a drilling fluid that seeps into the formation 114 during the drilling process. Thus, when fluids are withdrawn from the formation 114 they may initially include mud filtrate. In some examples, formation fluids are withdrawn from the formation 114 and pumped into the borehole 110 or into a large waste chamber (not shown) in the tool 101 until the fluid being withdrawn becomes sufficiently clean. A clean sample is one where the concentration of mud filtrate in the sample fluid is acceptably low so that the fluid substantially represents native (i.e., naturally occurring) formation fluids. Once the fluid being withdrawn becomes sufficiently clean, a sample fluid may be further analyzed, measured, and/or collected for analysis. In the illustrated example, the tool 101 is provided with a fluid store module 130 to store collected fluid samples.

Sensor(s) of the fluid analyzer module 125 may provide measurements as the fluid is being pumped (e.g. during a clean-up phase). In the case of optical sensors (e.g., a spectrometer), optical densities received from the optical sensors may be used to compute a formation fluid composition. Also, extrapolation techniques may be used in combination with fluid measurements made during a clean-up phase to predict fluid properties that would be exhibited by pristine fluid samples. Although the testing tool 101 is provided with the fluid store 130 to bring samples to the surface for subsequent analysis, the fluid analyzer module 125 can be advantageously used to measure fluid properties of the formation fluid while the formation fluid is being extracted downhole from the formation 114. To generate formation fluid data that is relatively more representative of the fluid in the formation 114, the example methods and apparatus described herein may be implemented by measuring fluid properties in situ and communicating the measured fluid property data to the surface for subsequent analyses based on that data. Measuring the extracted formation fluid downhole (i.e., in situ) allows the formation fluid to remain at substantially the same pressure and temperature and to maintain substantially the same fluid component mixture state it would have while in the formation 114. In contrast, bringing the formation fluid samples to the surface changes the temperature, pressure, and other characteristics of the fluid such that fluid property measurements performed at the surface may yield different results than if the same measurements were performed downhole. Thus, measuring the extracted formation fluid downhole provides measurement values that are relatively more representative of the properties or characteristics of the formation fluid in the formation 114.

Thus, the disclosed methods may have far-reaching applications, such as to the overall operation of the tool. For example, sampling profiles and/or sampling decisions may be changed or made based on the herein disclosed methods. Specifically, sampling profiles, known to those of ordinary skill in the art, may be changed by altering a pumping rate, moving the tool to a different position along the borehole, changing an amount of sampled fluid, changing a draw-down rate and/or changing a pressure of the sampled fluid. Similarly, the methods may be used to make decision on whether or not to store sampled fluids. For example, sampling tools, such as the tool 101, typically include a sample module having one or more sample chambers for storing fluids. Being that the number of chambers is limited, it becomes important that only the samples of importance—regardless of criteria— are stored. Accordingly, the disclosed methods may be used to analyze the sample fluids to help determine whether the fluid should be stored (e.g. the fluid is of sufficient quality, is of different composition, is indicative of zonal isolation) or ejected from the tool.

Figure 2:
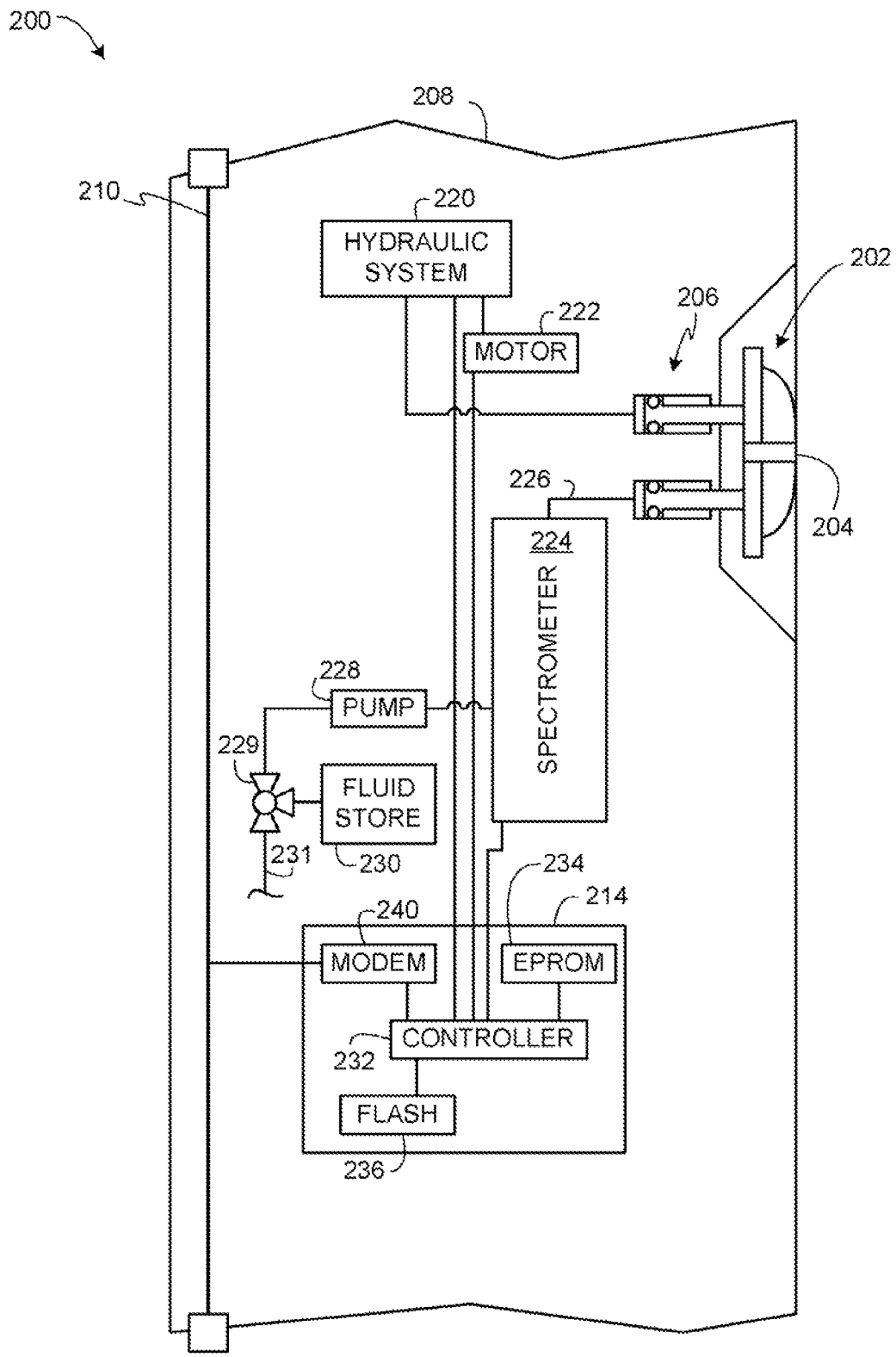
FIG. 2 depicts a block diagram of an example DFA tool that may be implemented in connection with the example wireline tool of FIG. 1.

FIG. 2 depicts a block diagram of an example DFA tool 200 that may be used to implement, for example, the example fluid analyzer module 125 of FIG. 1. The example DFA tool 200 may be configured to extract and store fluid samples that can be brought to the surface for subsequent analysis. In the illustrated example of FIG. 2, lines shown connecting blocks represent fluid or electrical connections that may comprise one or more flow lines (e.g., hydraulic fluid flow lines or formation fluid flow lines) or one or more wires or electrically conductive paths.

Turning in detail to FIG. 2, to perform downhole measurements, the DFA tool 200 is provided with a single probe 202, although more probes may be provided in other example implementations. In the illustrated example, the probe 202 includes a port 204 to admit formation fluid into the DFA tool 200. An extending mechanism 206 may be provided to extend the probe 202 to sealingly engage the formation 114 (FIG. 1). In alternative example implementations, inflatable packers can be used instead of the probe 202 to establish fluid connections with formations and draw fluid samples.

The DFA tool 200 is provided with a chassis 208. The chassis 208 provides electric power to electronic components and provides hydraulic power to hydraulic components. The chassis 208 includes a tool bus 210 configured to transmit electrical power and communication signals between the DFA tool 200 and a surface system (e.g., the electronics and processing system 118 of FIG. 1). The chassis 208 further includes a hydraulic system 220 and an optional motor 222. The hydraulic system 220 and/or the motor 222 may be configured to control the probe 202 and to power a pump 228 for extracting formation fluid via the probe 202.

The chassis 208 is provided with a spectrometer 224 to measure the optical density of formation fluid samples. For example, the spectrometer 224 may include one or more light sources configured to provide photons having energies corresponding to a particular wavelength range and optical detectors to determine the intensity of the light sources at the various wavelengths as well as the intensity of light transmitted through fluid samples at those wavelengths. A spectrometer that may be used to implement the example spectrometer 224 to measure the optical densities of formation fluid samples at a plurality of energy channels or a plurality of wavelengths is described in U.S. Pat. No. 4,994,671 issued to Safinya et al. In the illustrated example, fluid from the formation 114 flows through the probe 202 to the spectrometer 224 via a flow path 226. In other example implementations in which measurements (e.g., density measurements, NMR measurements, resistivity measurements, capacitance measurements, etc.) other than or in addition to optical density measurements are used, the spectrometer 224 may be replaced or supplemented with other types of suitable sensors including, for example, NMR sensors, density sensors, resistivity sensors, capacitance sensors, etc.

The spectrometer 224 is in line with the pump 228 via fluid passageways. The pump 228 is configured to draw formation fluid through the probe 202 and through the spectrometer 224 to enable the spectrometer 224 to measure properties or characteristics of the extracted formation fluid. A controller 232 is configured to control a valve 229 to route the fluid samples out of the DFA tool 200 via a passageway 231 or to route the fluid samples to a fluid store 230 to bring the fluid samples to the surface for subsequent analysis. The fluid store 230 may be implemented using one or more tanks or bottles.

Although the DFA tool 200 is provided with the fluid store 230 to bring samples to the surface for subsequent analysis, the spectrometer 224 can be advantageously used to measure fluid properties of the formation fluid while the formation fluid is being extracted downhole from the formation 114. As described above, measuring the extracted formation fluid downhole provides measurement values that are relatively more representative of the properties or characteristics of the formation fluid in the formation 114.

To store, analyze, process, and/or compress test and measurement data (or any other data acquired by the DFA tool 200), the DFA tool 200 is provided with an electronics system 214. The electronics system 214 may include the controller 232 (e.g., a CPU and Random Access Memory) to control operations of the DFA tool 200 and implement measurement routines (e.g., to control the spectrometer 224, etc.). To store machine accessible instructions that, when executed by the controller 232, cause the controller 232 to implement measurement processes or any other processes, the electronics system 214 is provided with an electronic programmable read only memory (EPROM) 234. In the illustrated example, the controller 232 is configured to receive digital data from various sensors in the DFA tool 200.

To store measurement data, or any kind of data, acquired by the DFA tool 200 using, for example, the spectrometer 224, the electronics system 214 is provided with a flash memory 236. To communicate information when the DFA tool 200 is downhole, the electronics system 214 is provided with a modem 240 that is communicatively coupled to the tool bus 210. In the illustrated example, the modem 240 enables retrieving measurement information stored in the flash memory 236.

Although the components of FIG. 2 are shown and described above as being communicatively coupled and arranged in a particular configuration, persons of ordinary skill in the art will appreciate that the components of the DFA tool 200 can be communicatively coupled and/or arranged differently than depicted in FIG. 2 without departing from the scope of the present disclosure. In addition, the example methods, apparatus, and systems described herein are not limited to a particular conveyance type but, instead, may be implemented in connection with different conveyance types including, for example, coiled tubing, wireline, wired-drillpipe, and/or other conveyance means known in the industry.

Figure 3:
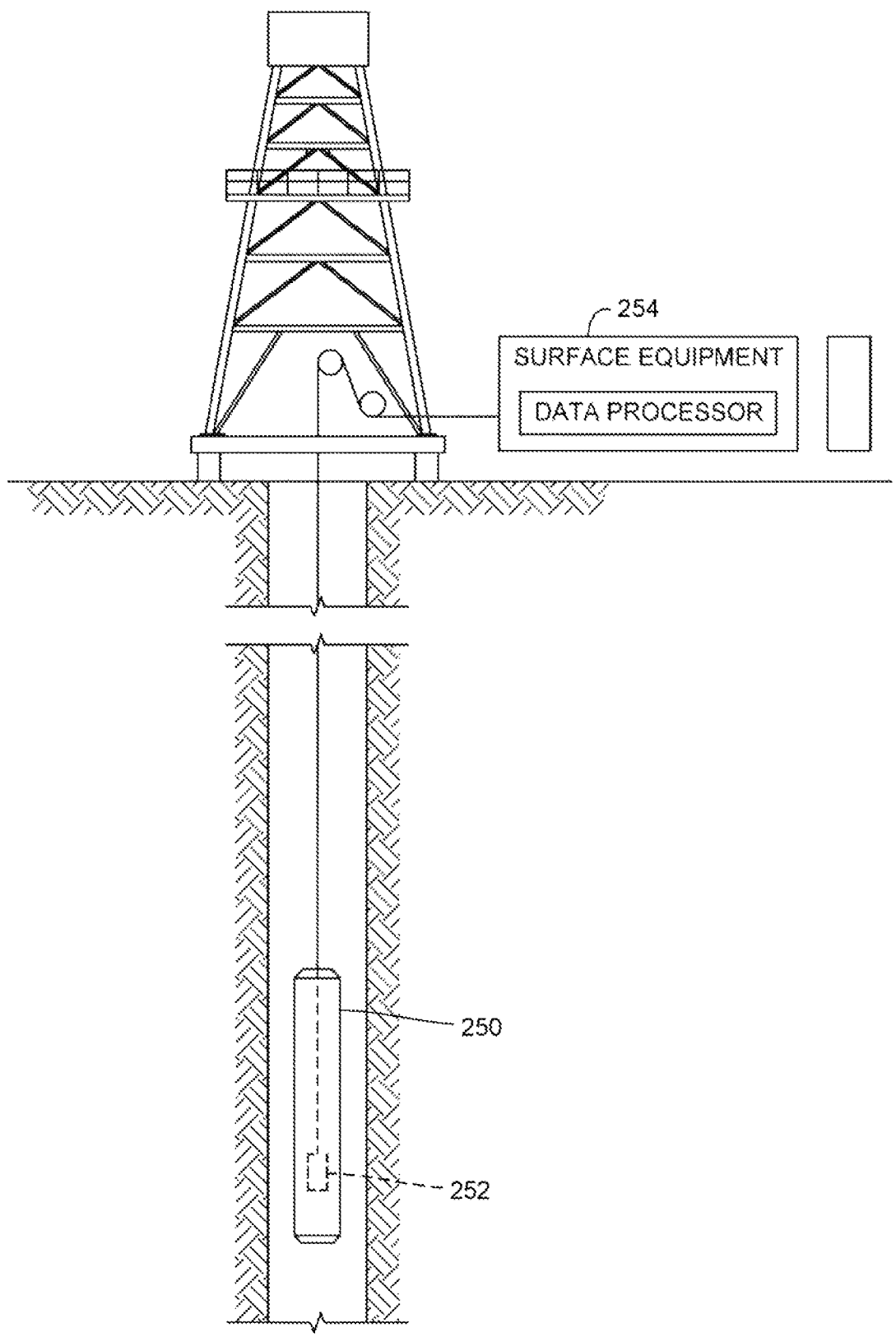
FIG. 3 depicts another example wireline tool that may be used to implement the example methods and apparatus described herein.

In some implementations, the example methods and apparatus described herein may be implemented using a permanent downhole sensor tool. In the example of FIG. 3, a wireline tool 250 housing at least one downhole sensor is illustrated. This tool may be modified, such that a permanent or fixed apparatus for downhole use is created. Mainly this requires removing the standard wireline configuration from the tool 250 and installing various tubular components commonly called the "completion" of the well. The permanent downhole sensor tool would be a component of the completion. The tool may also include other modification know to those of ordinary skill in the art. The example wireline tool 250 is provided with one or more sensor(s) 252 (e.g., NMR sensors, density sensors, resistivity sensors, capacitance sensors, etc.) used to measure fluid properties that can be communicated uphole to a data processor 254 and used to predict or estimate PVT fluid properties as described herein.

Figure 4:
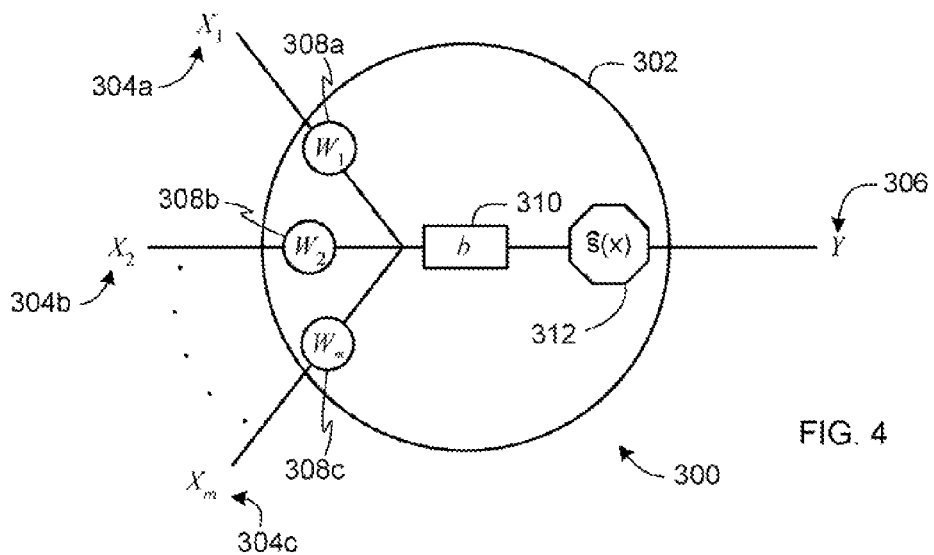
FIG. 4 depicts an example ANN node that may be used to implement the ANN of FIG. 5.

FIG. 4 depicts an example ANN node 300 (the ANN node 300) having a neuron 302, a plurality of input interfaces 304a-c and an output interface 306. One or more ANN nodes substantially similar or identical to the ANN node 300 can be used to implement the example methods and apparatus described herein. For example, the example methods and apparatus described herein can be implemented using an example ANN 400 of FIG. 5 having a plurality of nodes that may be substantially similar or identical to the example ANN node 300.

In the illustrated example of FIG. 4, each of the inputs $X_1$-$X_m$ 304a-c is provided with a respective one of a plurality of weighting values $W_1$-$W_m$ 308a-c, a bias value b 310, and an activation function ($\hat{s}(x)$) 312. The weighting values $W_1$-$W_m$ 308a-c are applied to the input values $X_1$-$X_m$ 304a-c to apply more or less weight to each of the input values $X_1$-$X_m$ 304a-c so that each value has a greater or a lesser effect on the output data (Y) at the output interface 306. The bias value b 310 is applied to the weighted sum of the input values $X_1$-$X_m$ 304a-c so that the input of the activation function 312 is biased. The activation function 312 may be chosen amongst activation functions known in the art such as, for example, a sigmoid function.

To produce desired or optimum values at the output 306 for respective input values at the inputs $X_1$-$X_m$ 304a-c, the ANN node 300 is trained during a training phase to learn the correct values for the weighting values $W_1$-$W_m$ 308a-c and the bias value b 310. That is, during the training phase, the ANN node 300 determines the weighting values $W_1$-$W_m$ 308a-c and the bias value b 310 to quantify the correlations or relationships between input values at the inputs $X_1$-$X_m$ 304a-c and corresponding output values (Y) 306. In this manner, during a subsequent recognition (prediction) phase, the ANN node 300 can use the correlations or relationships indicated by the learned values for the weighting values $W_1$-$W_m$ 308a-c and the bias value b 310 to produce the desired output values based on provided input values.

Figure 5:
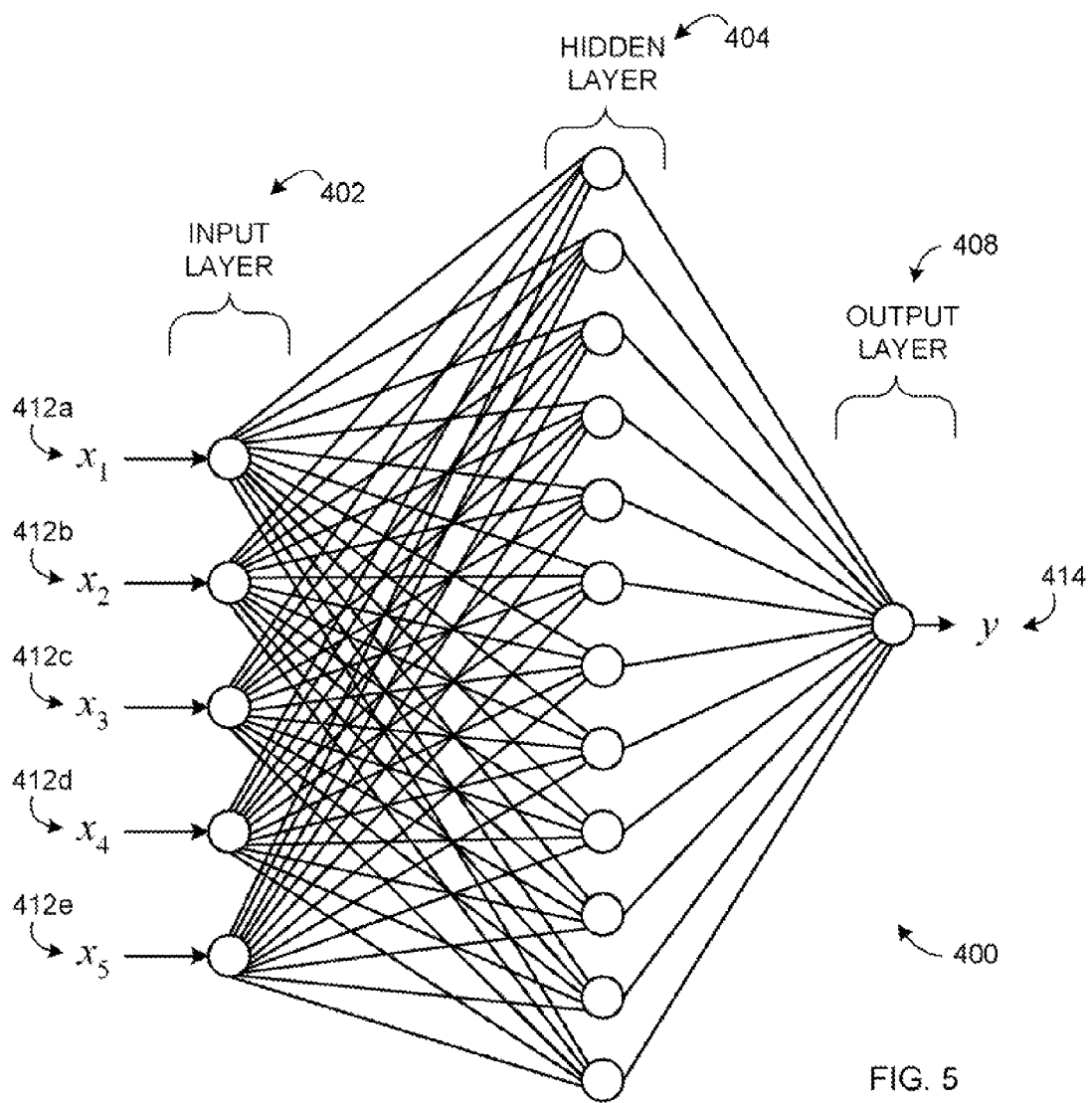
FIG. 5 depicts an example ANN that may be used to implement the example methods and apparatus described herein.

The example ANN 400 of FIG. 5 is implemented using a feedforward multilayer perception (FF-MLP) ANN model. In the illustrated example, the example ANN 400 includes a plurality of layers including an input layer 402, a hidden layer 404, and an output layer 408. Each of the layers 402, 404, and 408 is provided with one or more nodes, each of which includes inputs and outputs. Although not shown, the inputs are provided with weighting values and bias values similar to the weighting values $W_1$-$W_m$ 308a-c and the bias value b 310 of FIG. 4. The FF-MLP ANN 400 of FIG. 5 determines output values by progressively communicating or feeding values forward through the layers 402, 404, and 408. In particular, in the illustrated example, each node of the input layer 402 receives a respective one of a plurality of input values $x_1$-$x_5$ 412a-e and outputs a respective value to each of twelve nodes in the hidden layer 404. The nodes of the hidden layer 404 then generate respective output values based on the outputs from the input layer 402 and communicate their outputs to the node of the output layer 408. The output layer 408 node then generates an output value y 414 based on the outputs from the hidden layer 404. Although the illustrated example ANN 400 has one hidden layer and one output value, in other example implementations, an ANN may be implemented using more hidden layers and/or more output values.

In the illustrated example, the example ANN 400 is configured to estimate PVT properties of formation fluid samples. That is, the ANN 400 provides the estimated PVT property values at the output y 414. To generate estimated PVT property values, the input values $x_1$-$x_5$ 412a-e are component values that describe a multi-component composition of a formation fluid. For example, if the fluid composition of a multi-component fluid includes five components, each of the five components can be provided to a respective one of the inputs 412a-e of the example ANN 400, and the ANN 400 can output an estimated PVT value via the output layer 408. An example five-component formation fluid composition may include carbon dioxide ($CO_2$) and four hydrocarbon groups: methane ($C_1$), ethane ($C_2$), propane to pentane ($C_3$-$C_5$), hexane and heavier hydrocarbons ($C_{6+}$). The concentration of each component can be determined using measurements performed by a downhole tool (e.g., the example DFA tool 200 of FIG. 2) and can be provided to the example ANN 400 to determine the output y 414.

While formation fluid composition is used in the example, it should be understood that the ANN 400 may also be configured to receive measurement values directly from the DFA tool 200 including, for example, optical density values at a plurality of wavelengths in the near and/or mid infrared range. In such an example implementation, the ANN 400 may process DFA tool measurements to determine formation fluid composition and predict PVT property values. Furthermore, although the example formation fluid composition described above includes five fluid components, any other types of fluid components may be used as inputs of the ANN 400 if desired.

To generate correct output values at the output y 414, the example ANN 400 may be trained using training data including input values (e.g., component concentration values) and respective output values (e.g., PVT property values). During a training phase, the ANN 400 determines correlations or relationships between input values and output values by applying a first set of input values to the inputs $x_1$-$x_5$ 412a-e and adjusting the weighting values and bias values of each of the nodes of the layers 404 and 408 until the values at the output y 414 are substantially equal to true values (i.e., laboratory-measured values) corresponding to the first set of input values applied to the inputs $x_1$-$x_5$ 412a-e. In the illustrated example, the training input values and output values may be obtained from a training database (e.g., the training database 2002 of FIG. 12) of known data, derived using other methods. For example, a training database that may be used to train the example ANN 400 to determine estimated PVT property values may include laboratory-measured fluid composition and PVT data (e.g., input data and output data) of reservoir fluids from around the world. In addition, the database can also include laboratory-measured data from derivative fluids from intermediate steps of differential vaporization studies (for oils) and depletion studies (for gas condensates). In some example implementations, a training database can include data (e.g., input data and output data) corresponding to hundreds of discrete formation fluid samples.

Figure 6:
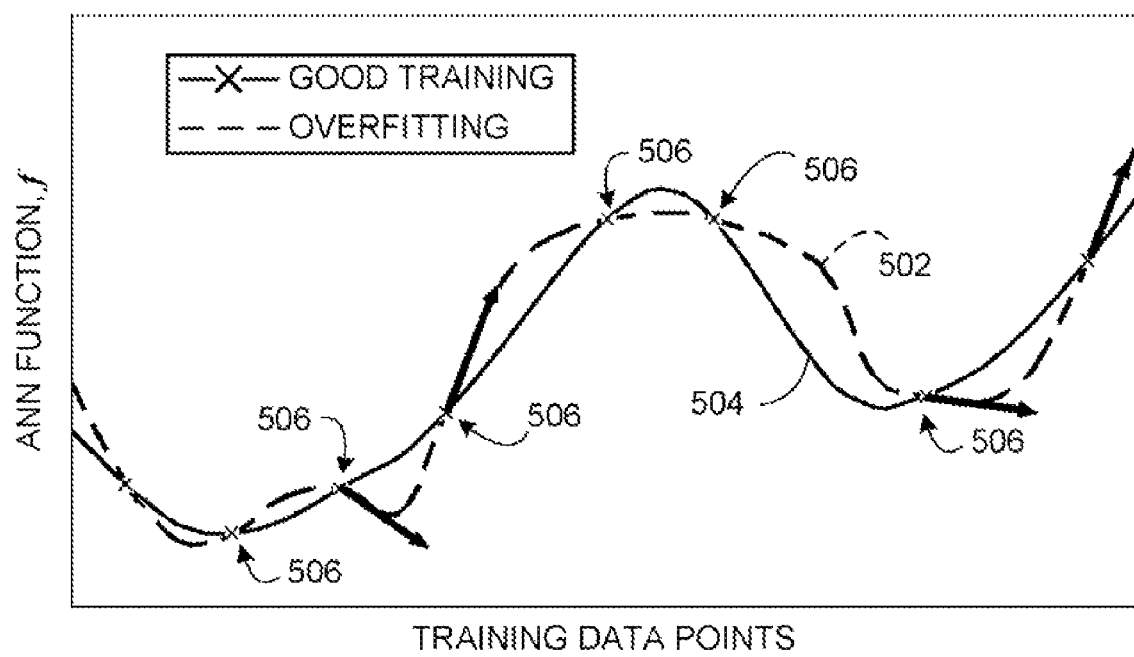
FIG. 6 depicts example curve plots of a well-trained ANN and an overfitted ANN.

The training procedure described above is used to minimize the deviations between the output values generated by the ANN 400 and the true values. In some instances, an ANN may exhibit an effect called overfitting when a training procedure causes the ANN to display very small training error but large errors when in use with input data that lies in areas sparsely populated with training data or areas outside the boundaries of the training data. The behavior of a typical one-input and one-output overfitted ANN together with that of a well-trained ANN is illustrated in FIG. 6. As shown, although an output curve 502 of the overfitted ANN matches the training datapoints 506, the overfitted ANN output curve 502 displays hills and valleys between the well-matched training datapoints 506. Depending on the sparsity of the training datapoints 506, these irregularities may be relatively high or deep.

Overfitting occurs when the typical error function to be minimized does not account for the behavior between the training datapoints 506. An overfitted ANN may implement a function (e.g., a function corresponding to the output curve 502 of FIG. 6) that displays relatively high curvatures. In other words, a second derivative of the ANN function possesses high values. High curvatures are generally associated with unrealistic derivative values at the training datapoints 506. To avoid high curvatures, the derivative values of those training datapoints should be constrained. For example, the approximate second derivative of an ANN implemented function (f) at a midpoint ($x_m$) between two close datapoints ($x_1$) and ($x_2$) should be made low, as shown in equation 1 below.

$$\left.\frac{\partial^2 f}{\partial x^2}\right|_{x_m} \approx \frac{\left.\frac{\partial f}{\partial x}\right|_{x_2} - \left.\frac{\partial f}{\partial x}\right|_{x_1}}{x_2 - x_1} \approx 0 \Rightarrow \left.\frac{\partial f}{\partial x}\right|_{x_1} \approx \left.\frac{\partial f}{\partial x}\right|_{x_2} \quad \text{Equation 1}$$

Equation 1 above indicates that to obtain smooth ANN performance (e.g., the output curve 504 of FIG. 6) between close training datapoints (e.g., the training datapoints 506 of FIG. 6), the derivative values of those training datapoints must be sufficiently equal.

Thus, overfitting can be reduced or substantially eliminated by introducing some information associated with the model derivatives into the training phase. In some example implementations, such information can be obtained by physical inspection of the problem to be modeled. For example, the derivative values represented by equation 1 above may be determined based on a thermodynamic model of a reservoir fluid and/or gradient vectors of close or neighboring datapoints. If some indicating derivative values are available, a training algorithm used to train the ANN can be modified so that the derivatives of the trained ANN are sufficiently close to known values from training data. In other example implementations, a smooth surface can be obtained if the derivatives do not vary much between close training datapoints (e.g., the training datapoints 506 of FIG. 6). In other words, the accuracies of the outputs can be improved if gradient vectors are forced to be similar for close or neighboring datapoints.

Returning to FIG. 5, in the illustrated example, the ANN 400 is implemented using an m-dimensional input vector (x) by an n-dimensional output vector (y) network in which m=5 (e.g., the mass fractions $C_1$, $C_2$, $C_3$-$C_5$, $C_{6+}$, and $CO_2$) and n=1 (e.g., the estimated GOR value). The relationship between the inputs $x_1$-$x_5$ 412*a-e*, the output y 414, the weighting values (e.g., the weighting values $W_1$-$W_m$ 308*a-c* of FIG. 4), and the bias values (e.g., the bias value b 310 of FIG. 4) of the ANN 400 is set forth in an ANN function of equation 2 below.

$$y = s(W_L \cdot s\{W_{L-1} \cdot s[\ldots s(W_0 x + b_0)] + b_{L-1}\} + b_L) \quad \text{Equation 2}$$

In equation 2 above, a layer quantity value (L) specifies the quantity of hidden layers in the ANN 400, a weight matrix ($W_L$) specifies a matrix of weighting values for a particular layer (L), and a bias vector ($b_L$) specifies a vector of biases for a particular layer (L).

In some example implementations, a single hidden layer with a sufficient number of nodes in the hidden layer is capable of approximating a continuous, differentiable function. Thus, if the layer quantity (L) is equal to one (i.e., L=1), the ANN function of equation 2 can be expressed as shown in equation 3 below.

$$y = s[W_1 \cdot s(W_0 x + b_0) + b_1] \quad \text{Equation 3}$$

In equations 2 and 3 above, an activation function s(x) defines how the ANN 400 conditions input data to generate output data. The activation function (s(x)) can be defined as shown in equations 4 and 5 below.

$$s(x) = \begin{bmatrix} \hat{s}(x_1) \\ \vdots \\ \hat{s}(x_m) \end{bmatrix}, \text{ where} \quad \text{Equation 4}$$

$$\hat{s}(x_i) = \frac{1}{1 + \exp(-x_i)} \quad \text{Equation 5}$$

As shown in equation 4, the activation function s(x) produces a vector of data generated using a logistic function or a sigmoid function $\hat{s}(x_i)$, which is defined in equation 5 above. As shown in equations 2-5, the ANN 400 generates output data at the output y 414 by performing two linear operations and two nonlinear operations.

To process input values within a particular range, the inputs to the ANN 400 are normalized to a [0,1] range using the equation 6 below.

$$\tilde{x}_i = \frac{x_i - x_{i,min}}{x_{i,max} - x_{i,min}}, \text{ where } i = 1, m \quad \text{Equation 6}$$

In equation 6 above, $x_{i,min}$ is the minimum value of the input $x_i$ in the training database, and $x_{i,max}$ is the maximum value of the input $x_i$ in the training database.

In some instances, the output values at the output y 414 are distributed over a wide numerical range. To normalize the output values, the ANN 400 can be configured to perform the logarithmic transformation function shown in equation 7 below on the output values.

$$\tilde{y} = 0.8 \left\{ \frac{\ln(y) - \ln(y_{min})}{\ln(y_{max}) - \ln(y_{min})} \right\} + 0.1 \quad \text{Equation 7}$$

In equation 7 above, $y_{min}$ is the minimum value of GOR in the training database, and $y_{max}$ is the maximum value of GOR in the training database. When using the ANN 400 to determine estimated GOR values, equation 7 can be used to normalize GOR logarithms to a [0.1, 0.9] range to ensure that the output values at the output y 414 are within a [0, 1] range of the sigmoid function of equation 5 above.

Using equations 6 and 7 above, the ANN function of equation 3 above can be expressed as shown in equation 8 below.

$$\tilde{y} = s[W_1 \cdot s(W_0 \tilde{x} + b_0) + b_1] \quad \text{Equation 8}$$

In the illustrated, example, the ANN 400 is configured to determine an estimated GOR based on an output value ($\tilde{y}$) from equation 8 above based on equation 9 below.

$$GOR = \exp \left\{ \frac{(\tilde{y} - 0.1)[\ln(y_{max}) - \ln(y_{min})]}{0.8} + \ln(y_{min}) \right\} \quad \text{Equation 9}$$

The ANN model 400 is trained using a training database. During a training phase, the ANN 400 learns the underlying behavior of the training dataset stored in the training database. There are numerous algorithms available for training neural network models. The output values generated by the ANN 400 during the training phase are values for the elements of the weight matrices $W_L$ and vectors $b_L$. Typically, the ANN 400 is trained using a portion of datapoints stored in the training database (e.g., a training set), and then validated using datapoints in a validation set that were not used for training. For example, 90% of the training datapoints of a database could be selected at random for training, and the remaining 10% could be used for validation of the ANN 400.

After training the ANN 400, the resulting weighting values and bias values to be applied by the ANN 400 are stored in data structures (e.g., data matrices, data vectors, etc.). Example weighting value and bias value data matrices are shown in FIGS. 7A, 7B, 8A, and 8B. In particular, FIG. 7A depicts a $W_0$ weighting value matrix 600, FIG. 7B depicts a $b_0$ bias value vector 650, FIG. 7A depicts a $W_1$ weighting value matrix 700, and FIG. 7B depicts a $b_1$ bias value vector 750. As discussed above, the input vector x of the ANN 400 has a dimension of m=5 corresponding to the mass fractions of the five components $C_1$, $C_2$, $C_3$-$C_5$, $C_{6+}$, and $CO_2$, (normalized if desired) and the output vector y has a dimension of n=1 corresponding to the estimated GOR value (normalized if desired). The hidden layer 404 (FIG. 5) has five input neural nodes and twelve output neural nodes, so the $W_0$ weighting value matrix 600 has a dimension of 12×5 and the $b_0$ bias value vector 650 has a dimension of 12. In the illustrated example of FIG. 5, the output layer 408 has twelve input neural nodes and one output neural node. Thus, the $W_1$ weighting value matrix 700 has a dimension of 1×12 and the $b_1$ bias value vector 750 has a dimension of 1.

The performance of the ANN 400 can be measured by entering data from the training set portion of a training database, and comparing the output data generated by the ANN 400 to true output values (i.e., laboratory-measured values). From these comparisons, a mean relative error, a mean absolute relative error, and a standard deviation can be determined. A similar performance measurement process can be performed using the validation set portion of the training database. An ANN-based process of performing downhole fluid analyses has good performance over a wide range of downhole fluids and unexpectedly better performance than traditional methods of performing downhole fluid analyses. This becomes evident when comparing the plots of FIGS. 11A and 11B, as will be discussed in more detail below.

To determine an uncertainty value (e.g., a confidence value, a quality value, etc.) indicative of the accuracy of the values generated by the ANN 400, the function shown in equation 10 below can be used to determine the uncertainty of the output values based on the uncertainty of the input values.

$$\sigma^2 = \sigma_y^2 + \sum_{i=1}^{m} \left(\frac{\partial y}{\partial x_i}\right)^2 \sigma_{x_i}^2 \qquad \text{Equation 10}$$

In Equation 10, the output, uncertainty ($\sigma$) (e.g., the standard deviation) represents the uncertainty of the output values generated by the ANN 400 and the model uncertainty ($\sigma_y$) is the uncertainty of the ANN model even if the input data contains no errors. The summation term corresponds to the effect of the uncertainty of each input. A partial derivative $$\left(\frac{\partial y}{\partial x_i}\right)$$

represents the partial derivative of the ANN model output (y) (e.g., a GOR value) with respect to its inputs ($x_i$) (e.g., mass fractions of components). The partial derivative $$\left(\frac{\partial y}{\partial x_i}\right)$$

can be computed analytically (by determining the derivative of equation 8 above) or it can be computed numerically using a finite difference formula. An estimated standard deviation ($\sigma_{x_i}$) represents the estimated standard deviation of the inputs ($x_i$). Equation 10 above indicates that inputs with large derivatives and/or large measurement errors have the greatest effect on the uncertainty of the estimated output values.

A confidence interval for an estimated GOR value can be estimated from the uncertainly value determined using equation 10 above. For example, a confidence interval of an example implementation may indicate that the probability is 68% that the true GOR value of a particular fluid sample lies in the range shown in equation 11 below, where (y) is the estimated GOR value and ($\mu$) is the average error of the model (i.e., the model bias). Expanding the range of possible GOR values as shown in equation 12 below increases the probability to 95% that the true GOR value of the fluid sample lies within the expanded range.

$$[y-\mu-\sigma, y-\mu+\sigma] \qquad \text{Equation 11}$$

$$[y-\mu-2\sigma, y-\mu+2\sigma] \qquad \text{Equation 12}$$

Uncertainty values determined using equation 10 above can be used to convey the confidence of the accuracies of the values generated by the ANN 400. In this way, the uncertainty values can be used to make subsequent decisions such as, for example, to determine whether to capture and store a fluid sample, abort a DFA operation, etc. Each uncertainty value can be stored in association with its respective ANN-generated output value(s) as shown in, for example, an example well log data structure 800 of FIG. 9. The well log data structure 800 stores log data generated using the output values generated by the ANN 400, and each log data entry 802 is stored in association with a respective sample number or other sample identifier 801, a respective relative uncertainty value 804 (e.g., the output uncertainty value $\sigma$ as determined above relative to the ANN-generated output y), and corresponding input data 806 measured by the DFA tool 200 and provided to the ANN 400. In other example implementations, one uncertainty value may be stored in association with a plurality of log data entries, and the uncertainty value can be indicative of the confidence of the accuracies of those log data entries. The uncertainty values 804 can be presented in association with their respective log data 802 by, for example, printing or displaying the uncertainty values 804 in association with their respective log data 802.

FIG. 10 depicts an example performance table 900 showing the performance of the ANN 400 of FIG. 5 after a training process. In the illustrated example, the ANN 400 was trained using 90% of an 1834-point database (the complete set). The database comprises 1341 datapoints corresponding to a range of GOR values typically comprising non-volatile and volatile oils (GOR<=3000 scf/stb), and 493 datapoints corresponding to a range of GOR values typically comprising gas condensates and wet gases (GOR>3000 scf/stb). In the illustrated example, the performance table 900 shows the performance of the ANN 400 relative to the training data used to train the ANN 400 and relative to the separate validation data used to validate the performance of the ANN 400. In particular, the performance table 900 shows that the ANN 400 generates output fluid property values having a mean absolute relative error less than about 15% relative to true values (i.e., laboratory-measured values) of fluid properties of downhole fluid samples. The performance of the ANN 400 relative to the training data may be determined by entering training data inputs from a training database to the ANN 400, capturing the output values generated by the ANN 400, and comparing the output values from the ANN 400 to the output values in the training database to determine the accuracy of the output values. The performance of the ANN 400 relative to the validation data may be determined in a similar way using the separate validation data set. In the illustrated example, the performance table 900 shows that the ANN 400 performs substantially the same with the training data and the validation data, which indicates the degree of robustness of the training process of the ANN 400.

The performance table 902 also shows the performance of the ANN 400 relative to the oil data set (GOR<=3000 scf/stb) and the gas data set (GOR>3000 scf/stb). The performance of the ANN 400 relative to the oil data set and the gas data set may be determined in a way similar to the way described above. In the illustrated example, the performance table 902 shows that the ANN 400 performs substantially the same with the oil data and the gas data, which indicates the relatively high degree of robustness of the ANN 400 over a wide range of downhole fluids.

Figure 11A:
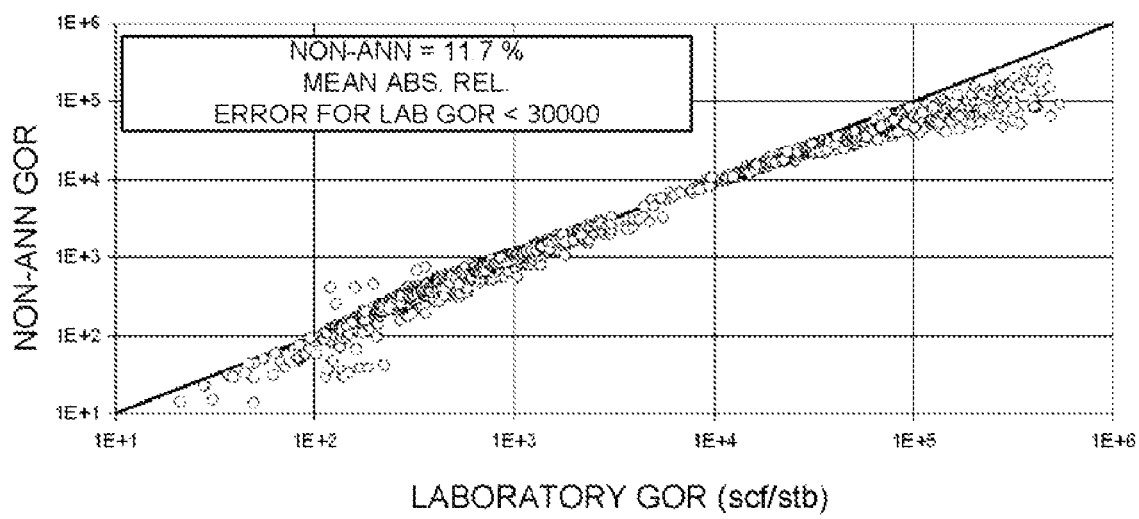
FIG. 11A shows a scatter graph of the performance of a Non-ANN downhole fluid analyses.
Figure 11B:
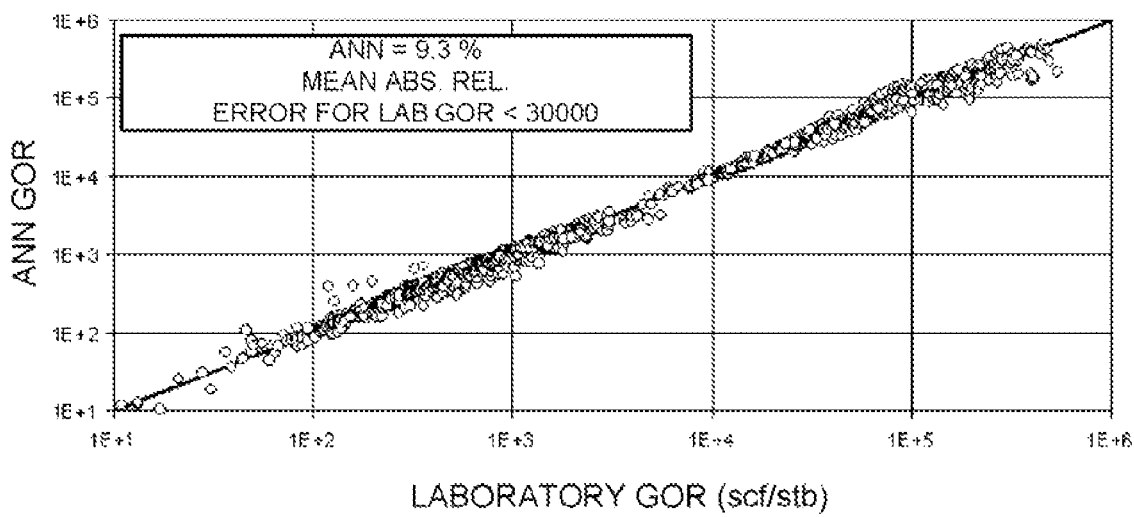
FIG. 11B shows a scatter graph of the performance of the ANN of FIG. 5.

This is seen when comparing FIGS. 11A and 11B. FIG. 11A shows a scatter graph of the performance of a non-ANN methodology. The scatter graph indicates that the non-ANN method does not generate good estimated GOR values over the entire range of fluids spanning from non-volatile and volatile oils (GOR<=3000 scf/stb) to gas condensates and wet gases (GOR>3000 scf/stb) when compared to the ANN method of FIG. 11B. In particular, the non-ANN method generates poor estimated GOR values at both the low range (GOR<300 scf/stb, approximately) and the high range (GOR>50,000 scf/stb, approximately).

FIG. 11B shows a scatter graph of the performance of the ANN 400. The scatter graph indicates that the ANN 400 generates relatively good estimated GOR values over the entire range of fluids spanning from non-volatile and volatile oils (GOR<=3000 scf/stb) to gas condensates and wet gases (GOR>3000 scf/stb).

Figure 12:
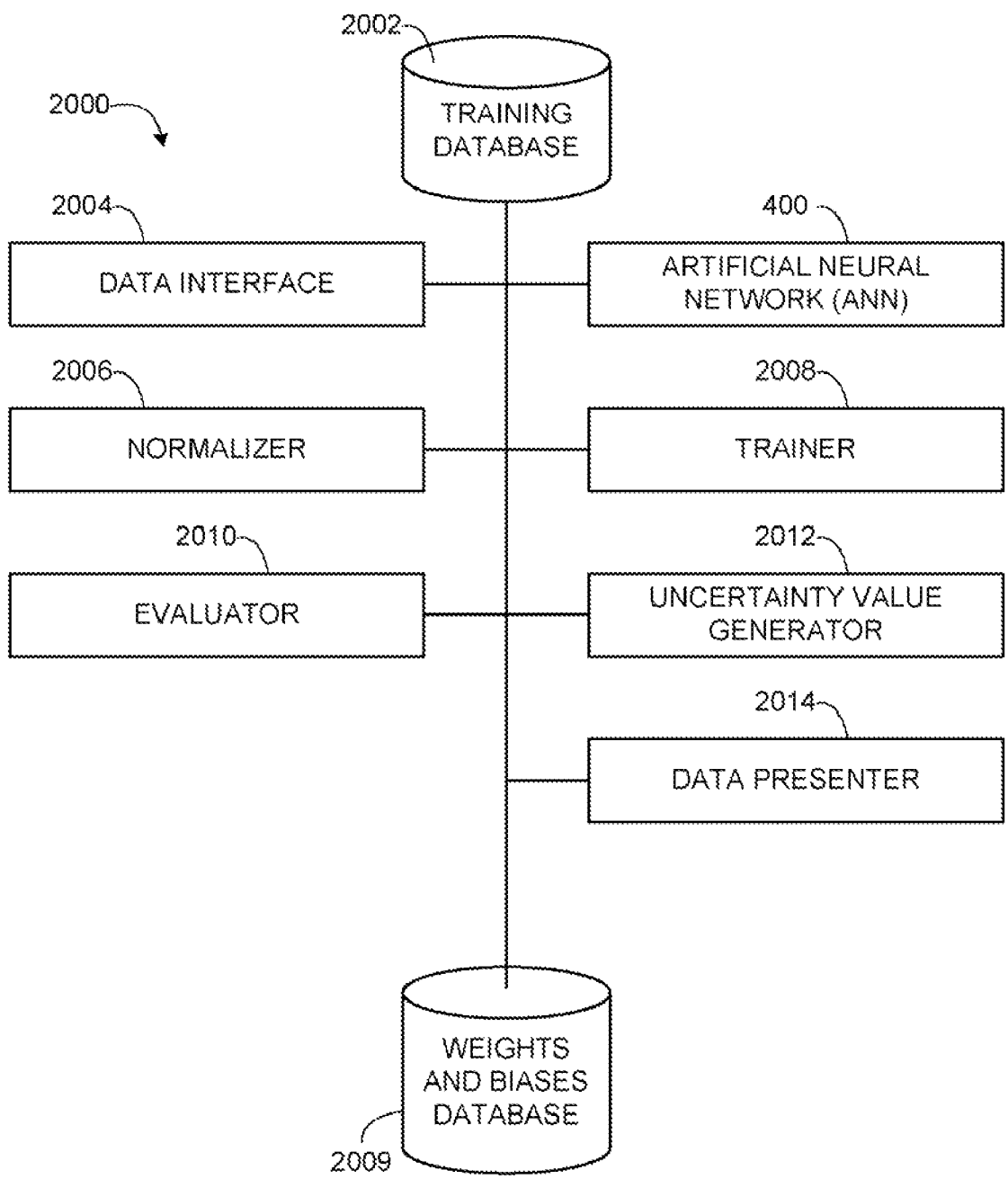
FIG. 12 depicts a block diagram of an example system or apparatus that may be used to perform downhole fluid analyses using the example ANN of FIG. 5.

FIG. 12 depicts a block diagram of an example apparatus 2000 that may be used to perform DFA of formation fluid samples using an ANN (e.g., the ANN 400 of FIG. 5). The example apparatus 2000 may be implemented using any desired combination of hardware, firmware, and/or software. For example, one or more integrated circuits, discrete semiconductor components, or passive electronic components may be used. Additionally or alternatively, some or all of the blocks of the example apparatus 2000 or parts thereof, may be implemented using instructions, code, and/or other software and/or firmware, etc. stored on a machine accessible medium that, when executed by, for example, a processor system (e.g., the electronics and processing system 118 of FIG. 1) perform the operations represented in the flowcharts of FIGS. 13 and 14. In the illustrated example, the example apparatus 2000 is implemented at a surface system such as, for example, the electronics and processing system 118 of FIG. 1. In this configuration, the example DFA tool 200 communicates fluid properties measured in situ by means of the wireline tool 101 to the electronics and processing system 118, and the example apparatus 2000 is configured to obtain the measured fluid properties and use the ANN 400 to generate output data of the formation fluid samples measured by the DFA tool 200. In some example implementations, the example apparatus 2000 can be configured to generate output data using the ANN 400 so that each output datum corresponds (e.g., has a one-to-one correspondence) to a particular respective formation fluid sample located proximate to a sensor in the DFA tool 200. In this manner, the example apparatus 2000 can be used to characterize each fluid sample. Alternatively or additionally, the apparatus 2000 may be configured to obtain computed fluid properties (e.g., use extrapolation techniques to estimate or predict fluid properties that would be exhibited by fluid samples at a pristine condition). In this manner, the example apparatus 2000 can be used to characterize for example a pristine formation fluid sample. Although the example apparatus 2000 is described as having one of each block described below, the example apparatus 2000 may be provided with two or more of any block described below. In addition, some blocks may be disabled, omitted, or combined with other blocks.

To store training data to train the example ANN 400 of FIG. 5, the example apparatus 2000 may be provided with a training database 2002. In the illustrated example, the training database 2002 stores laboratory-measured input data corresponding to the inputs $x_1$-$x_5$ 412a-e of FIG. 5 and corresponding laboratory-measured data corresponding to the output y 414 of FIG. 5. When used to estimate PVT property values such as GOR values, the training database 2002 can store laboratory-measured concentration (e.g., mass fraction) values of the $C_1$, $C_2$, $C_3$-$C_5$, $C_{6+}$, and $CO_2$ components of various formation fluid samples from around the world and the corresponding GOR property values of those formation fluid samples. In addition, the training database 2002 may also include laboratory-measured data from derivative fluids from intermediate steps of differential vaporization studies (for oils) and depletion studies (for gas condensates). The training database 2002 can include data corresponding to hundreds of discrete formation fluid samples. The example apparatus 2000 can use the stored training data to train the ANN 400 to generate estimated GOR property values of formation fluids when used to perform downhole fluid analyses. The training database 2002 can be continuously expanded to refine the performance of the ANN 400 by periodically or aperiodically retraining the ANN 400 using the newly added laboratory-measured data. It should be understood that the training database 2002 is optional and may not be implemented if a weights and biases database 2009 corresponding to a trained ANN is provided.

To obtain input data and generate output data, the example apparatus 2000 is provided with a data interface 2004. In the illustrated example, during a training phase, the data interface 2004 is configured to retrieve training data from the training database 2002. During a recognition (prediction) phase, in which the example apparatus 2000 is used to perform downhole fluid analyses, the data, interface 2004 can receive input data for the inputs $x_1$-$x_5$ 412a-e of FIG. 5 from, for example, the DFA fool 200. In addition, the data interface 2004 is configured to store output data (e.g., estimated GOR property values) from the output y 414 in, for example, the flash memory 236 (FIG. 2) and/or any other memory in which the data is to be stored.

To process the input data to generate estimated PVT property values, the example apparatus 2000 is provided with the example ANN 400. In other example implementations, the example apparatus 2000 can be provided with a different type of ANN including an ANN having a different number of nodes and/or layers than the example ANN 400. Additionally or alternatively, the example apparatus 2000 may be provided with an ANN of a type different from a feedforward multi-layer perceptron (FF-MLP) ANN. To normalize input data, the example apparatus 2000 is provided with a normalizer 2006. In the illustrated example, the normalizer 2006 is configured to normalize input data using equation 6 above and inverse-normalize output data using equation 9 above.

To train the ANN 400, the example apparatus 2000 is provided with a trainer 2008. In the illustrated example, the trainer 2008 is configured to implement a training process to train the ANN 400 to learn correlations or relationships between input data and output data. The trainer 2008 may be implemented using any of a variety of known training techniques. An example training technique involves applying input values at the inputs $x_1$-$x_5$ 412a-e (FIG. 5) of the ANN 400, comparing the output of the ANN 400 to a laboratory-measured value corresponding to the input values, and communicating a feedback error signal to the input layer 402 to cause the nodes of the input layer 402, the hidden layer 404, and the output layer 408 to adjust or self-tune their weighting values (e.g., the weighting values $W_1$-$W_m$ 308a-c of FIG. 4) and their bias values (e.g., the bias value b 310 of FIG. 4) until the output value of the ANN 400 matches or substantially matches the true value (i.e., the laboratory-measured value). The trainer 2008 can store the adjusted or tuned weighting and bias values (e.g., the weighting and bias values of the example data structures 600 (FIG. 7A), 650 (FIG. 7B), 700 (FIG. 8A), and 750 (FIG. 8B)) in a weights and biases database 2009 for subsequent use by the ANN 400. The trainer 2008 can also be configured to periodically or aperiodically retrain the ANN 400 as additional laboratory-measured data is stored in the training database 2002. It should be understood that the trainer 2008 is optional and may not be implemented if a weights and biases database 2009 corresponding to a trained ANN is provided.

To test and evaluate the performance of the ANN 400, the example apparatus 2000 is provided with an evaluator 2010. The evaluator 2010 may be configured to test and evaluate the performance of the ANN 400 by entering data from the training database 2002 and comparing the output data generated by the ANN 400 to the laboratory-measured values in the training database 2002. From these comparisons, the evaluator 2010 can determine a mean relative error (e.g., ($\mu$) of equations 11 or 12), a mean absolute relative error, and/or a standard deviation (e.g. ($\sigma_y$) of equation 10) for various sets of input data. The evaluator 2010 can then determine overall error and deviation values to determine the performance of the ANN 400 over a wide range of input values. Additionally or alternatively, the evaluator 2010 can implement a similar performance measurement process using a separate validation data set of laboratory-measured input and output values other than the laboratory-measured training data in the training database 2002 used to train the ANN 400. It should be understood that the evaluator 2010 is optional and may not be implemented if the error and standard deviation parameters associated to a trained ANN are provided.

To determine uncertainty values (e.g., confidence values, quality values, etc.) indicative of the accuracy of the values generated by the ANN 400, the example apparatus 2000 is provided with an uncertainty value generator 2012. The uncertainty value generator 2012 can be configured to determine the uncertainty of the output values based on the uncertainty of the input values using equation 10 above.

To present data to a user, the example apparatus 2000 is provided with a data presenter 2014. The data presenter 2014 may be implemented using a display and/or a printer and may be configured to present the output data (e.g., GOR values) generated by the ANN 400. In some example implementations, the data presenter 2014 may be used to present the output data in association with respective uncertainty values generated by the uncertainty value generator 2012.

Figure 13:
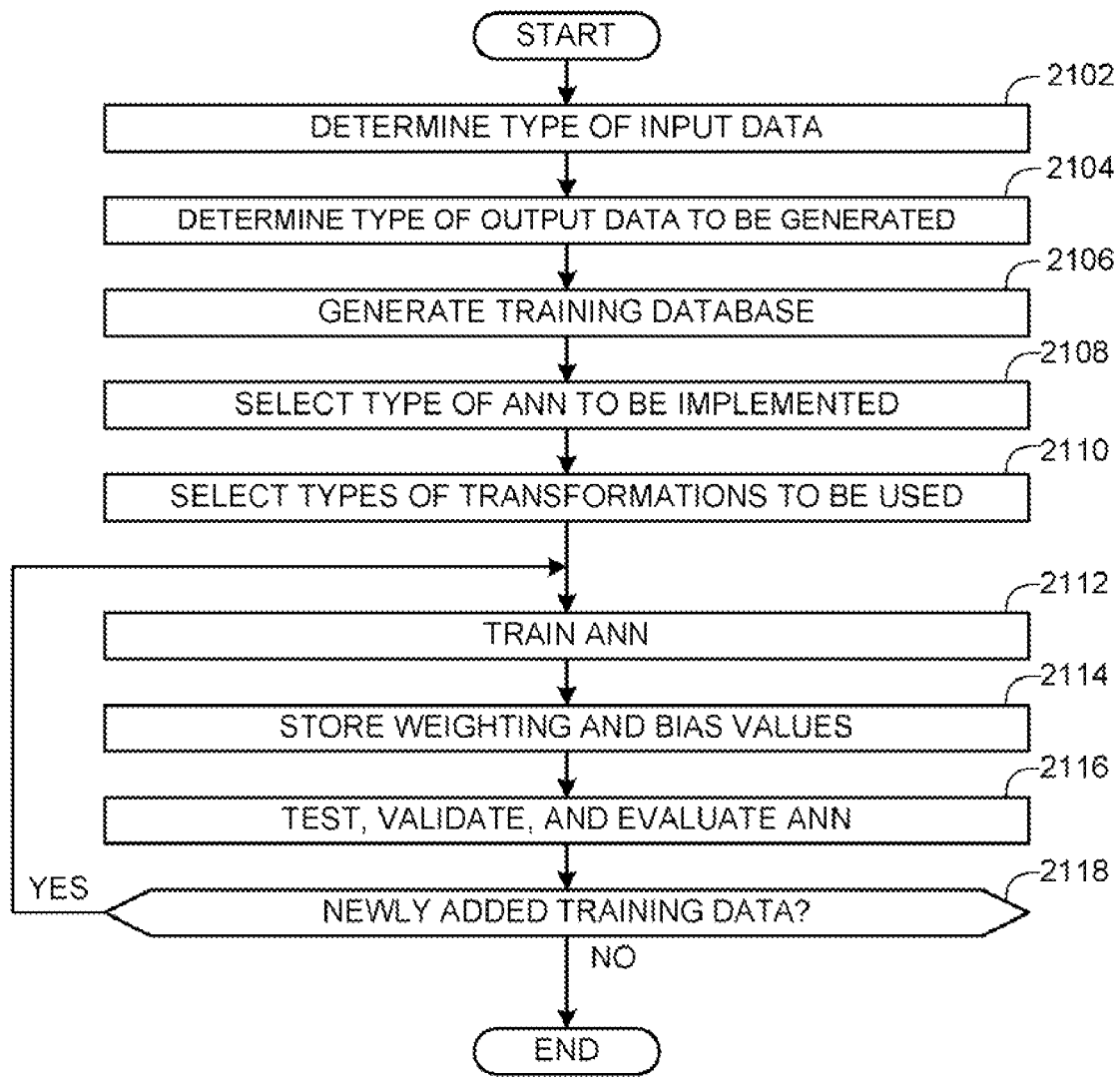
FIG. 13 depicts a flowchart of an example method that may be used to implement the example apparatus of FIG. 12 to train the ANN of FIG. 5.
Figure 14:
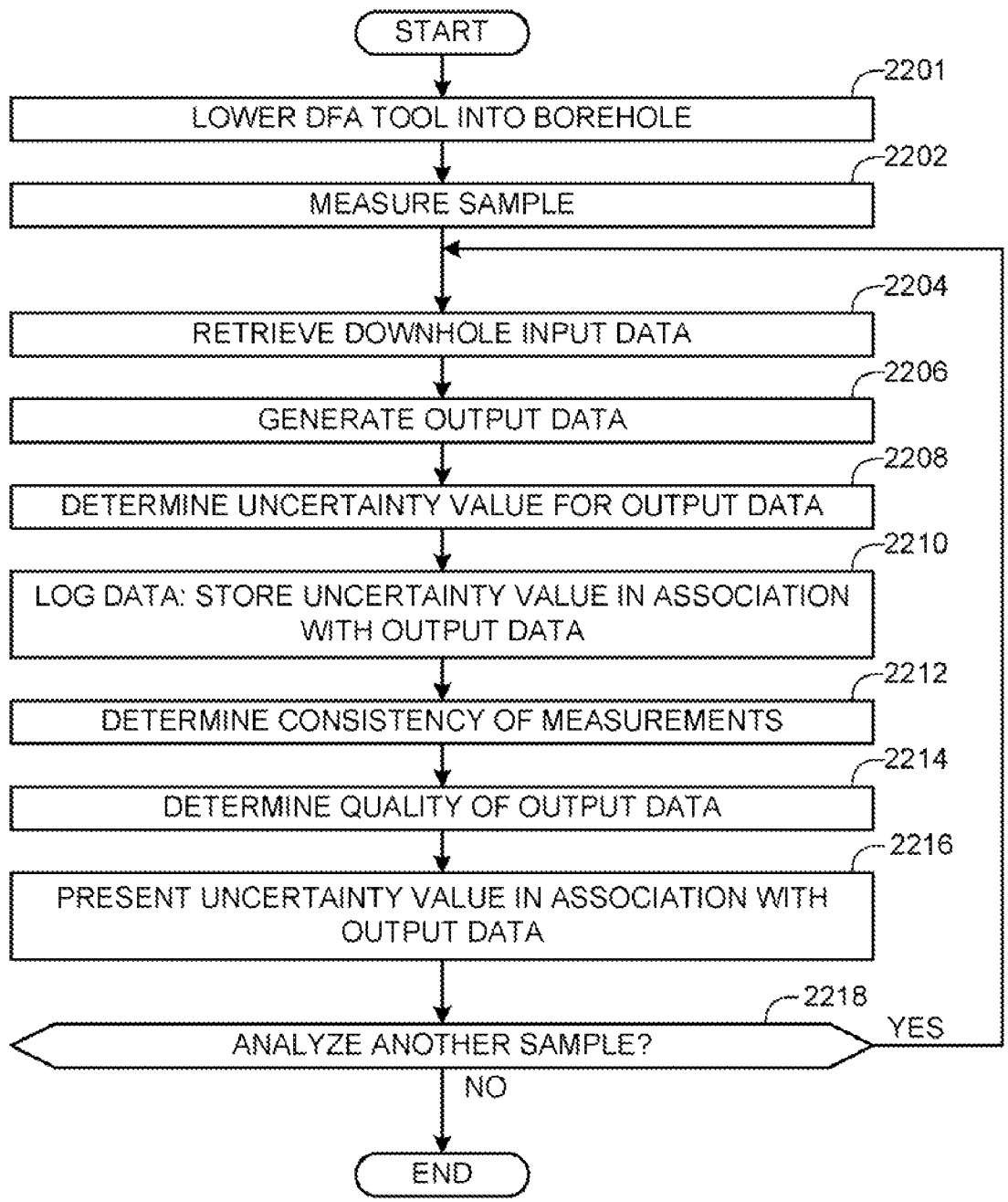
FIG. 14 depicts a flowchart of an example method that may be used to implement the example apparatus of FIG. 12 to determine property values of formation fluid samples.

FIGS. 13 and 14 are flowcharts of example methods that may be used to implement the example apparatus 2000 of FIG. 12 to perform downhole fluid analyses of formation fluid samples. The example methods of FIGS. 13 and 14 may be implemented using software and/or hardware. Although the example methods are described with reference to the flowcharts of FIGS. 13 and 14, persons of ordinary skill in the art will readily appreciate that other methods to implement the example apparatus 2000 of FIG. 12 may additionally or alternatively be used. For example, the order of execution of the blocks depicted in the flowcharts of FIGS. 13 and 14 may be changed, and/or some of the blocks described may be rearranged, eliminated, or combined.

Turning in detail to FIG. 13, to develop and train the example ANN 400, initially the example apparatus 2000 (FIG. 12) determines the type of input data (block 2102) to be provided to the ANN 400 (FIGS. 5 and 12). For example, the example apparatus 2000 can determine the type of measurements to be made by the example DFA tool 200 (FIG. 2). As discussed in the examples above, input data may include component formation fluid composition data such as, for example, concentration (e.g., mass fraction) values of $C_1$, $C_2$ $C_3$-$C_5$, $C_{6+}$, and $CO_2$, each of which can be associated with one of the inputs $x_1$-$x_5$ 412*a-e* (FIG. 5) of the example ANN 400.

The example apparatus 2000 then determines the type of output data to be generated (block 2104). For example, the apparatus 2000 may determine that it is to generate estimated PVT property values such as GOR values of the formation fluid samples. In the illustrated example, the example apparatus 2000 may determine the type of input data and output data based on user-provided information and/or by retrieving configuration settings from, for example, a memory (e.g., the EPROM 234 of FIG. 2). The training database 2002 described above in connection with FIG. 12 is then generated (block 2106) by, for example, storing laboratory-measured input data, and output data in the training database 2002.

The type of ANN to be implemented is then selected (block 2108). In the illustrated example, the ANN 400 of FIGS. 5 and 12 is implemented using a feedforward multilayer perceptron (FF-MLP). In other example implementations, other types of ANN models may be selected. In some example implementations, the type of ANN can be selected by the example apparatus 2000 based on user-provided information and/or configuration data stored in a memory.

The types of data transformations to be used are then selected (block 2110). Data transformations may include data conditioning functions such as, for example, the data normalizer functions of equations 6 and 7 above. In some example implementations, the data transformations to be used may be specified by a user and/or the example apparatus 2000 may retrieve the data transformations from configuration information stored in a memory.

The trainer 2008 (FIG. 12) trains the ANN 400 (block 2112) using, for example, retrieving training data from the training database 2002 as discussed above. During the training operation of block 2112, the ANN 400 learns correlations or relationships between training input data and training output data by tuning weighting and bias values so that the ANN 400 can generate the training output data based on corresponding training input data. After the weighting values and bias values are tuned to produce the desired output data, the data interface 2004 stores the adjusted or tuned weighting and bias values (block 2114) (e.g., the weighting and bias values of the example data structures 600 (FIG. 7A), 650 (FIG. 7B), 700 (FIG. 8A), and 750 (FIG. 8B)) in the weights and biases database 2009 (FIG. 12) for subsequent use by the ANN 400. The evaluator 2010 then tests, validates, and evaluates the performance of the ANN 400 (block 2116) as, for example, discussed above.

After the ANN 400 is configured and ready to generate estimated values, the example apparatus 2000 can be used in connection with the DFA tool 200 of FIG. 2 during one or more DFA processes to analyze formation fluid samples from the formation 114 (FIG. 1). An example DFA process is described below in connection with FIG. 14.

In the illustrated example, the trainer 2008 determines whether any newly added training data is stored in the training database 2002 of FIG. 12 (block 2118). If the trainer 2002 determines that the training database 2002 includes newly added training data (block 2118), control is passed back to block 2112 and the trainer 2008 retrains the ANN 400 (block 2112) using the newly added training data. However, if newly added training data is not stored in the training database 2002 (block 2118) the example process of FIG. 13 ends.

The example method of FIG. 14 may be used to analyze formation fluid from the formation 114 (FIG. 1) using the ANN 400 while the DFA tool 200 is extracting the formation fluid from the formation 114. The example method of FIG. 14 described below to analyze formation fluid samples may be performed during any type of downhole evaluation process, such as a formation test well test, or production monitoring operation. Initially, the DFA tool 200 is lowered into the borehole 110 (block 2201). The DFA tool 200 measures a formation fluid sample (block 2202) using, for example, the spectrometer 224 of FIG. 2. The data interface 2004 retrieves DFA input data (block 2204) measured by the DFA tool 200 at block 2202. For example, the data interface 2004 receives input data (e.g., mass fraction values of $C_1$, $C_2$, $C_3$-$C_5$, $C_{6+}$, and CO2) for the inputs $x_1$-$x_5$ 412*a-e* of FIG. 5 from the DFA tool 200.

The ANN 400 then generates output data (block 2206) based on the retrieved input data. For example, the ANN 400 can use the weighting and bias values in connection with equations 3-9 above to determine estimated GOR values of formation fluid. The data interface 2004 can then store the estimated values in a memory (e.g., the flash memory 236 of FIG. 2). In some example implementations, the ANN 400 can be configured to generate output data corresponding to particular respective formation fluid samples such that an output datum corresponds to a particular formation fluid sample. In this manner, the example apparatus 2000 can be used to characterize each fluid sample with its own respective property data.

The uncertainty value generator 2012 then determines an uncertainty value for the output data (block 2208) generated at block 2206. For example, the uncertainty value generator 2012 can generate the uncertainty value using equation 10 above. The data interface 2004 then generates and stores log data by storing the uncertainty value in association with the output data (block 2210) in, for example, the well log data structure 800 of FIG. 9. Quality assurance methods can be used to determine the consistency of fluid composition measurements obtained using different DFA tools (block 2212) and to assess the quality of the output data generated by the ANN 400 (block 2214) based on, for example, the log data stored in the well log data structure 800.

The data presenter 2014 then presents the uncertainty value in association with its respective output data (block 2216). For example, the data presenter 2014 can present the uncertainty value determined at block 2208 in association with the output data generated at block 2206 via a printer and/or a display to enable a user to, for example, determine whether the certainty of the output data is sufficient to use the output data.

The example apparatus 2000 determines whether it should analyze another formation fluid sample (block 2218). If the example apparatus 2000 is to analyze another formation fluid sample, control is passed back to block 2204. Otherwise, the process of FIG. 14 ends.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method to determine formation fluid properties, the method comprising:
    obtaining a first formation fluid property value of a formation fluid sample from a fluid analyzer tool;
    providing the first formation fluid property value to an artificial neural network; and
    utilizing the artificial neural network to predict a second formation fluid property value based on the first formation fluid property value.

2. A method as defined in claim 1, wherein the first formation fluid property value includes at least one fluid composition value.

3. A method as defined in claim 2, wherein the fluid composition value is a concentration value of a component in the formation fluid sample.

4. A method as defined in claim 3, wherein the concentration value comprises one of mass fraction, mass weight percent, mole fraction and mole percent.

5. A method as defined in claim 1, further comprising training the artificial neural network based on laboratory-measured input data and output data corresponding to a plurality of formation fluids.

6. A method as defined in claim 5, further comprising training the artificial neural network based on derivative values of the laboratory-measured input data and output data.

7. A method as defined in claim 6, wherein the derivative values are determined based on a thermodynamic model corresponding to a formation fluid.

8. A method as defined in claim 6, wherein the derivative values are determined based on gradient vectors of close or neighboring datapoints of the laboratory-measured input data and output data.

9. A machine accessible medium having instructions stored thereon that, when executed, cause a machine to:
    obtain a first formation fluid property value of a formation fluid sample from a downhole fluid analyzer tool process;
    provide the first formation fluid property value to an artificial neural network; and
    utilize the artificial neural network to predict a second formation fluid property value based on the first formation fluid property value.

10. A machine accessible medium as defined in claim 9 having instructions stored thereon that, when executed, cause the machine to train the artificial neural network using laboratory-measured input data and output data corresponding to a plurality of formation fluids.

11. A machine accessible medium as defined in claim 9 having instructions stored thereon that, when executed, cause the machine to determine log data based on the second formation fluid property value.

12. A machine accessible medium as defined in claim 11 having instructions stored thereon that, when executed, cause the machine to store the log data in a well log data structure.

13. A method to determine formation fluid properties, the method comprising:
    determining a correlation between a property of a first fluid and values indicative of concentrations in methane and ethane components of the first fluid;
    lowering a downhole fluid analyzer tool into a well;
    obtaining values indicative of the concentrations of methane and ethane components of a downhole fluid sample obtained by means of the downhole fluid analyzer tool; and
    generating a fluid property value associated with the downhole fluid sample based on the correlation and the obtained values.

14. A method as defined in claim 13, wherein the fluid property value is indicative of a property of the downhole fluid at stock-tank conditions.

15. A method as defined in claim 14, wherein the property at stock-tank conditions is indicative of a gas/oil ratio.

16. A method as defined in claim 13, wherein determining the correlation comprises training an artificial neural network.

17. A method as defined in claim 13, further comprising estimating an uncertainty of the fluid property value.

18. A method as defined in claim 13, wherein the correlation is further based on a concentration value of at least one of a lumped group $C_{6+}$, a lumped group $C_3$-$C_5$, or a fluid component $CO_2$.

19. A method as defined in claim 13, wherein the correlation is further based on a density of the downhole fluid.

20. A method of sampling a fluid in a borehole penetrating subterranean formation, the method comprising:

lowering a sampling tool into the borehole, the sampling tool comprising a fluid analyzer tool, a pumping module, and a module for fluidly coupling the tool to a formation;

obtaining a fluid sample from one of the formation and the borehole using a first sampling profile;

analyzing the fluid sample with the fluid analyzer tool;

determining a property of the fluid sample that is indicative of a composition of the fluid sample, and changing the first sampling profile based on the analysis of the fluid sample.

21. A method as defined in claim 20, wherein changing the first sampling profile includes at least one changing a pumping rate, moving the tool to a different position along the borehole, changing an amount of sampled fluid, changing a draw-down rate and changing a pressure of the sampled fluid.

22. A method as defined in claim 20, wherein determining a property of the fluid includes obtaining values indicative of the concentrations of methane and ethane components of the fluid sample.

23. A method of sampling a fluid in a borehole penetrating subterranean formation, the method comprising:

lowering a sampling tool into the borehole, the sampling tool comprising a fluid analyzer tool;

obtaining a first fluid sample from one of the formation and the borehole at a first station;

analyzing the first fluid with the fluid analyzer tool;

deciding, based on the analysis of the first fluid to one of store the first sample in a sample chamber and eject the first sample from the sampling tool;

moving the sampling tool to a second station;

obtaining a second fluid sample from one of the formation and the borehole at the second station;

analyzing the second fluid with the fluid analyzer tool; and deciding, based on the analysis of the second fluid, to one of store the second sample in a sample chamber and eject the second sample from the sampling tool.

24. A method as defined in claim 23, wherein the decision to eject the second sample is further determined based on the number of available sample chambers for storing sample fluids.

25. A method as defined in claim 23, wherein the decision to store or eject the second sample is at least partially based on comparing a composition of the first sample to a composition of the second sample.

26. A method as defined in claim 23, wherein analyzing the first and second fluids includes using an artificial neural network.

* * * * *